United States Patent Office 2,720,034
Patented Oct. 11, 1955

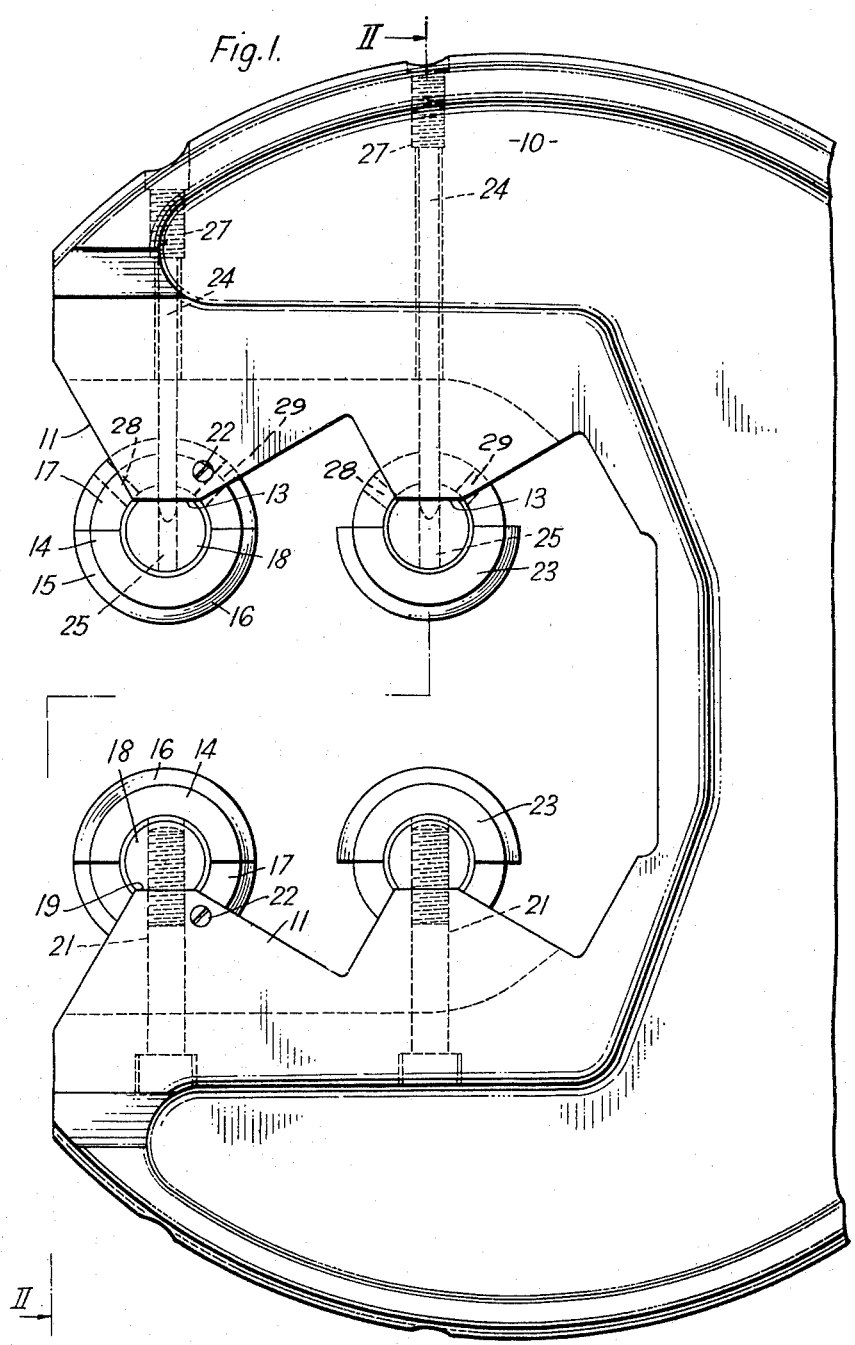

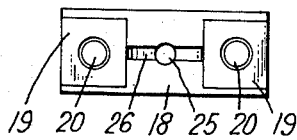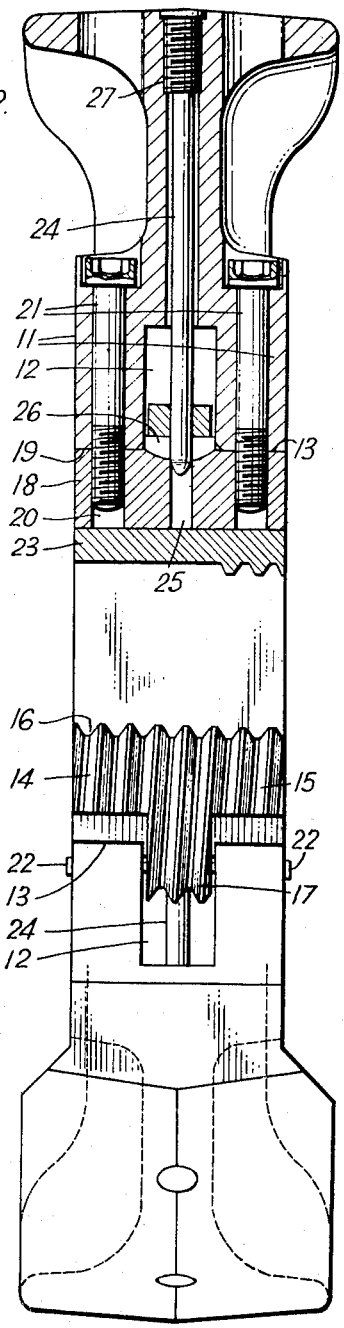

2,720,034

SCREW THREAD CALLIPER GAUGES

Sydney Arthur Wills and Evan Frederick James Gathercole, London, England, assignors to Tolimit Gauges Limited, London, England, a British company Application February 19, 1953, Serial No. 337,814

Claims priority, application Great Britain March 4, 1952

3 Claims. (Cl. 33—199)

This invention relates to screwthread calliper gauges of the "go and not-go" type. In such gauges there are two pairs of gauging members, one pair forming a "go" pair and the other pair forming a "not-go" pair. The gauge is so arranged that a screwthread to be gauged and whose characteristics lie within a permitted tolerance, in the case of an external screwthread can be passed between the "go" pair of gauging members but not between the "not-go" pair, or, in the case of internal screwthreads can be passed over the "go" pair of gauging members but not over the "not-go" pair.

It is one object of the present invention to provide a screwthread calliper gauge having an improved form of mounting for the gauging members.

In a screwthread calliper gauge according to the present invention the gauging members constituting the "go" pair are prevented from free movement relatively to the body of the gauge whereas the gauging members constituting the "not-go" pair are free to float in the transverse direction, that is in the direction parallel to the axis of the screwthread being gauged.

Preferably the gauging members constituting the "go" pair are capable of being adjusted in the transverse direction but can be locked against free movement in the transverse direction by means of adjusting members secured to the body of the gauge.

Conveniently both sets of gauging members are in the form of hollow rolls mounted on fixed pins, all the pins being arranged parallel with one another in the transverse direction. Where a "go" gauging member is mounted in a fixed transverse pin so as to be capable of rotation about the pin (for instance for bringing another portion of the gauging member into the operative gauging position) the adjusting members conveniently engage end surfaces of the gauging member which are accurately perpendicular to the axis of the pin so that the gauging member can be rotated without affecting its adjustment in the transverse direction.

In order that the nature of the invention may be appreciated more fully, a summary follows of the theoretically desirable features of a gauge or gauging external screw threads.

The "go" pair of gauging members in a screw thread gauge is required to measure the virtual effective diameter of the thread. The virtual effective diameter of an external thread is the diameter, measured on the pitch line, of a nut having threads of correct form and which is a perfect fit on the external thread. The virtual effective diameter is an upper limit since it takes into account all the errors which may occur in the thread such as errors in form, pitch, pitch diameter, helix angle and core diameter. However, it is not essential to use a complete nut for gauging the virtual effective diameter, since a pair of gauging members of chaser form may be employed, which can be regarded as representing a section through the axis of the nut. In a calliper gauge this pair constitutes the "go" pair, and any screw which can pass between them will have a virtual effective diameter of less than the upper limit to which the gauge is set. For accurate gauging the two "go" gauging members must be at all times accurately aligned with one another, and no relative movement in the transverse direction should be permitted. If there were no provision for transverse adjustment, however, it would be necessary to assemble the two "go" gauging members by very careful selection of the parts and by high precision fitting. By providing means for transverse adjustment of the "go" gauging members the alignment of these gauging members can be accurately adjusted after assembly.

In the case of the "not-go" pair of gauging members the requirements are different, since this pair is required to measure the simple effective diameter of the external screwthread. The simple effective diameter is the minimum diametrical distance between points where a plane normal to the axis of the thread cuts the flanks of the thread. The simple effective diameter is a lower limit and is unaffected by errors in form, pitch, helix angle, core diameter and the like. Since the "not-go" gauging members are required to gauge the minimum pitch diameter they should be free to float transversely so that they can find the minimum dimensions in question.

Gauges embodying the present invention therefore satisfy the requirements for gauging both virtual diameter and simple effective diameter.

Similar considerations apply to gauges for gauging internal screwthreads.

While the "not-go" pair of gauging members are free to float transversely, they must nevertheless be rigidly held against movement in any other direction. Thus in one form of the invention each "not-go" gauging member is slidably mounted on a fixed transverse pin, and a locating member is provided which can prevent rotation of the gauging member around the pin but permits sliding movement along the pin.

The invention may be carried into practice in various ways but one particular embodiment, namely a "go and not-go" calliper gauge for external screwthreads, will be described by way of example with reference to the accompanying drawings, in which:

Figure 1 is a side elevation of the gauge,

Figure 2 is an end view of the gauge partly in section taken along the line 11—11 of Figure 1, and Figure 3 is a plan view of a gauging member mounting pin.

As shown in the drawings the gauge comprises a strong and rigid body 10 of generally U-shaped form.

Projecting inwardly from the limbs of the U are flanges 11 spaced apart by a gap 12. Formed on the inner ends of these flanges are parallel flat seatings 13.

Adjacent to the extremities of the limbs are the "go" gauging members 14. These are in the form of hollow rolls provided around their peripheries will full-form thread formations 15. The thread formation extends over the full width of the roll for only a portion of the circumference, as shown at 16, the remaining portion 17 of the roll being narrow enough to fit in the gap 12 with sufficient clearance to afford room for adjustment. Passing through the hollow centres of the rolls are mounting members in the form of cylindrical pins 18, which are provided with flats 19. There are threaded holes 20 through these pins in the centres of the flats 19 into which are screwed bolts 21 for holding the pins 18 with their flats 19 abutting against the flats 13 of the body 10.

Passing transversely through the flanges 11 are adjusting screws 22 by which the "go" rolls can be accurately adjusted endways so as to bring the thread formation of each of these rolls into correct alignment with one another. These screws also prevent endwise movement of the "go" rolls when they have been correctly adjusted.

The "not-go" part of the gauge comprises two rolls 23 which are generally somewhat similar to the "go" rolls 14, being mounted on identical pins 18 and having similar cutaway parts. In this case, however, since these "not-go" rolls are required to measure the simple effective diameter of the screwthread to be gauged, they have a limited degree of free end float in the gaps 12 and no adjusting screws are provided. Also, the thread formation is different in that it is relieved so that it will only make contact with the screwthread being gauged in the region of the pitch line of the thread. Moreover, not more than three threads are provided in order that no account will be taken of errors in pitch, and these threads are arranged at one side of the roll as shown in Figure 2 so that the gauge can be applied right up to the head of a screw.

Provision may be made for rotating the rolls about the pins, for instance for bringing another portion of a roll into the operative gauging position. On the other hand any rotation of rolls during gauging would lead to inaccuracy, so that means must be provided for holding the rolls against rotation. To this end a locating needle 24 is provided for each roll, which needle fits into a hole midway along the roll and enters a bore 25 in the pin 18.

While it is desirable to locate the rolls firmly against rotation they must nevertheless be capable of limited endwise movement; free movement in the case of the "not-go" rolls and for adjustment in the case of the "go" rolls. To this end each pin 18 is provided with a slot 26 which is slightly narrower than the diameter of the bore 25 as shown in Figure 3. The locating needle 24 therefore only makes contact with the pin 18 on the short diametrically opposed arcuate surfaces where the bore 25 extends beyond the sides of the slot 26. Hence the needle can move in the direction of the length of the slot 26 for a limited distance which is substantially greater than the minute movement in the direction at right-angles to the length of the pin permitted by the clearance between the needle and the bore 25. The needle 24 is supported in the body 10 only by a screw formation 27 at its outer end and it has a substantial unsupported length between this screw formation and the gauging roll. The needle 24 is therefore sufficiently flexible to permit the required endwise movement of the roll.

The end surfaces of the "go" rolls 14 which are engaged by the inner ends of the adjusting screws 22 are machined so that they are accurately perpendicular to the pins 18, so that after release of the locating needles 24 the "go" rolls can be turned into another rotational position without upsetting their adjustment in the transverse direction. To this end the rolls are provided with alternative circumferentially spaced holes 28 and 29 midway along the rolls for selective engagement by the locating needle.

While the invention has been described particularly in relation to a "go and not-go" calliper gauge for external screwthreads it will be appreciated that it is readily applicable to calliper gauges for gauging internal screwthreads.

What we claim as our invention and desire to secure by Letters Patent is:

1. A combined "go" and "not go" gauge for gauging a screw threaded part, comprising a body, a pair of "not go" rotary gauging members mounted on transverse pins secured to said body, at least one of said "not go" gauging members being free to float in a transverse direction on the respective pin parallel to the axis of the screw threaded part being gauged, a pair of "go" rotary gauging members mounted on transverse pins secured to said body, each of said "go" gauging members being provided with accurate flat end surfaces perpendicular to its axis, adjustable positive locating elements associated with said body and arranged to engage said opposite flat end surfaces on each "go" gauging member to locate said "go" gauging member in the transverse direction, and locating means associated with the body and arranged to cooperate with each "not go" gauging member to locate it in any of at least two positions of angular rotation, but to permit transverse sliding movement thereof along the respective transverse pin.

2. A gauge as claimed in claim 1, in which the locating means comprises a needle formed of relatively resilient material, which is secured to the body of the gauge and passes through a bore provided in the respective gauging member, and cooperates with an elongated slot formation formed in the respective transverse pin, the major dimension of the slot formation being in the transverse direction parallel to the axis of the screwthread being gauged.

3. A gauge as claimed in claim 2, in which the slot formation is in the shape of a bore of slightly larger dimensions than the needle, and an elongated slot extending diametrically across said bore, the minor dimension of the elongated slot being somewhat less than the diameter of the bore.

References Cited in the file of this patent

UNITED STATES PATENTS

| 1,613,824 | Hanson | Jan. 11, 1927 |
| 2,022,089 | Pond | Nov. 26, 1935 |
| 2,367,255 | Aller et al. | Jan. 16, 1945 |

FOREIGN PATENTS

| 511,743 | Great Britain | Aug. 23, 1939 |
| 539,517 | Great Britain | Sept. 15, 1941 |
| 594,890 | Great Britain | Nov. 21, 1947 |